3,177,615
MUSHROOM SPAWN
Arthur C. Rowe, 59 Admiral Road, Ajax,
Ontario, Canada
No Drawing. Filed Feb. 1, 1963, Ser. No. 255,652
5 Claims. (Cl. 47—1.1)

This invention relates to the growth of fungus and the like, to the nature and character thereof, and to methods by which such growth may be promoted and accelerated and a more vigorous and rapidly maturing culture may be obtained.

The invention relates particularly to the growth of mushrooms and to the production of the substance or base from which they are grown generally referred to as spawn, and of improved characteristics, and which can be planted in conventional beds in which the mushrooms are grown.

Heretofore mushroom spawn has been grown in various ways including, in manure, on cereal grains and on tobacco stems. Improvements have been made in the production of this spawn but the methods of production have not kept pace with the times and are a handicap in the growth of mushrooms.

It is an object of the invention to improve the production of mushroom spawn and to provide a spawn in which the growth is healthier, more vigorous and at an accelerated rate which consumes less time in the over-all production.

Another object of the invention is to provide mushroom spawn having a natural oil and moisture content and composed of finer particles providing increased inoculating surface area and coffee grounds in finely divided form can be used at the ratio of approximately one part to two parts of cereal grain to produce the improved product desired and due to the increased number of finer particles has proportionately greater exposed surfaces for growth thereon.

A further object of the invention is to find and utilize a waste product such as spent coffee grounds which ordinarily would be discarded and which waste product contains the necessary substance to produce a more vigorous and faster growth.

Briefly stated, the mushroom spawn of the present invention is produced from a substance or base of spent coffee grounds after they have been used in the making of coffee and are ready to be discarded as waste. These coffee grounds contain natural oils and about 80% moisture which provides in the substrate moisture-holding capacity in excess of the permissible or allowable amount of moisture which cereal grains may contain and remain useful for the production of mushroom spawn.

In the production of mushroom spawn or mycelium growth in a substrate, coffee grounds ordinarily discarded as waste after their use in the making of coffee have been found to be an excellent basic substance for use in the production process. The coffee grounds should be of relatively fine particle size, the finer the particle size the better, to provide optimum surface area for inoculation. It has been found that with the cereal grain the addition of the finest particle size spent coffee grounds, thoroughly mixed therewith so that the particles become interspersed, causes uniform distribution and growth preventing overgrowth in certain areas of the spawn, ordinarily referred to as stroma. Also it has been found that the smallest cereal grains including kaffir corn have proven advantageous, and with the fine coffee grounds have produced excellent mycelium growth.

It will be understood from the foregoing that a substantially improved mushroom spawn is obtained which has a healthier, more vigorous and rapid growth, thus assuring with greater certainty the desired yield in a shorter time with greater possibilities of use of the spawn.

The advantages are derived from a number of factors including the characteristics of the coffee grounds, which contain natural oil and approximately 80% moisture, which cause rapid mycelium growth; in fact the inoculation and growth are so rapid that it is necessary to separate the coffee particles to prevent tight intertwining of the growth. Thus the spacing of the coffee particles by the relatively small cereal grain particles produces a uniformity of growth and distribution over the bed insuring full coverage of the bed in a shorter period of time with the mycelium of the coffee reinforced or assisted by that of the cereal grains. Another benefit obtained from the use of the coffee grounds is that the moisture is balanced in the final product at a higher rate than in the cereal grain and additional desirable moisture reserve is provided which is desirable in a vigorous growth of spawn.

Another important feature is the fact that the coffee grounds contain approximately ¼ cellulose which is of material assistance in the growth of mushroom mycelium. It has been found that a composition of approximately ⅓ coffee grounds and ⅔ cooked cereal grains, preferably wheat, may have approximately 6 to 10 parts of calcium carbonate (precipitated chalk) to every 100 parts of the coffee and cereal grains to neutralize it to promote the mycelium growth.

In the production of the mushroom spawn, cereal grain, preferably of small particle size, is placed in a container to which is added sufficient water to permit the grain to swell and consequently increase its moisture content without breaking down the cellulous structure of the grain. Thereafter the grain is thoroughly mixed, two parts to one, with coffee grounds, and sufficient calcium carbonate (precipitated chalk) is added to neutralize the material or bring it to 7 pH. Ordinarily the calcium carbonate is added before sterilization to the substrate in the amounts of 6 to 10 parts by weight per 100 parts by weight of the substrate.

After the cereal grain, coffee grounds and calcium carbonate are combined, the mixture is placed in containers, preferably bottles, and thoroughly mixed. The mixture is sterilized and cooked by being subjected to steam pressure of 15 to 20 pounds per square inch in a steam vessel or autoclave for a period of approximately one hour to one hour and ten minutes. The substrate is then inoculated by the introduction of mushroom culture, and then incubated at approximately 72° until the culture medium is overgrown with mycelium. The growth of the mycelium can be hastened by agitation, as for example, by shaking the vessels at intervals, thus more thoroughly distributing the mycelium throughout the containers or bottles, at the same time keeping the coffee grounds and cereal grains thoroughly mixed.

When the mycelium has fully developed on the individual particles or granules of the mixture until a relatively thick growth has developed, the spawn is ready for use.

In the use of the spawn the granular mixture of cereal grain and coffee grounds is removed from the bottle and the lumps are broken up and broadcast in the usual bed by hand or mechanical means as desired. Instead of having to bury the spawn as has been customary in the past, with coffee grounds the burying is unnecessary, provided the beds are sufficiently moist so that germination may take place quite readily.

The merchandising of the spawn may be in the containers or bottles in which the mixture is placed before sterilization and prior to inoculation, although preferably it is removed from the bottles and merchandized in cardboard containers, thus eliminating the necessity for the return of the bottles.

The present invention provides a mushroom spawn produced from cooked cereal grain combined with spent or waste coffee grounds, with a neutralizer added, the mass having been sterilized and then inoculated with mushroom culture or mycelium, thus producing a healthier, faster and more vigorous growth.

It will be obvious to those skilled in the art that various changes may be made in the invention without departing from the spirit and scope thereof and therefore the invention is not limited by that which is described in the specification, but only as indicated in the accompanying claims.

What is claimed is:
1. A mushroom spawn comprising coffee grounds and hydrated cereal grain inoculated with mushroom mycelium.
2. A mushroom spawn comprising a substrate of coffee grounds and hydrated cereal grain inoculated with mushroom mycelium.
3. A culture for the production of mushroom comprising coffee grounds and an additional cellulosic nutrient as a part thereof inoculated with mushroom mycelium, said additional nutrient being hydrated.
4. The culture of claim 3 in which the ratio of coffee grounds to said additional nutrient is on the order of 1 to 2.
5. The culture of claim 3 having approximately 6 to 10 parts of calcium carbonate to 100 parts of the coffee grounds and additional nutrient.

References Cited by the Examiner
UNITED STATES PATENTS

| 92,810 | 7/69 | Fish | 71—23 X |
| 1,869,517 | 8/32 | Sinden | 47—1.1 |
| 2,677,917 | 5/54 | Speakman | 47—1.1 |

ABRAHAM G. STONE, *Primary Examiner.*

T. GRAHAM CRAVER, *Examiner.*